(No Model.)

C. G. POLLEYS.
DEVICE FOR CLEANING BICYCLE CHAINS.

No. 545,972. Patented Sept. 10, 1895.

Witnesses
L. C. Hills.
A. L. Hough.

Inventor:
Charles G. Polleys,
by Franklin H. Hough
Atty.

UNITED STATES PATENT OFFICE.

CHARLES GEORGE POLLEYS, OF NEWPORT, RHODE ISLAND, ASSIGNOR OF ONE-HALF TO JOHN T. REAGAN, OF SAME PLACE.

DEVICE FOR CLEANING BICYCLE-CHAINS.

SPECIFICATION forming part of Letters Patent No. 545,972, dated September 10, 1895.

Application filed June 10, 1895. Serial No. 552,331. (No model.)

*To all whom it may concern:*

Be it known that I, CHARLES GEORGE POLLEYS, a citizen of the United States, residing at Newport, in the county of Newport and State of Rhode Island, have invented certain new and useful Improvements in Devices for Cleaning Bicycle-Chains; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in attachments for bicycles, and especially to a brush designed to clean the chain of the propelling mechanism, the brush being designed to rotate against the chain and in an opposite direction from that which the chain is moving, thus causing all foreign matter to be thoroughly cleaned out from the links of the chain.

A further object of the invention resides in the provision of two rotary brushes, which are journaled on spindles which are mounted in a frame secured to the frame of the bicycle at such a location that the spindles will frictionally contact with the tire of the rear wheel of the bicycle and the brushes bear against the upper and lower sides of the chain, and by positive contact of the spindles with the tire the brushes are caused to revolve at a greater rate of speed than that of the sprocket-chain.

A further object of the invention resides in the construction of a rack for holding the spindles, which is adapted to be secured to the frame of the bicycle in advance of the rear wheel by means of thumb-screws, suitable packing being interposed between the plates of the rack and the members of the bicycle, so as to protect the same from being marred.

To these ends and to such others as the invention may pertain, the same consists, further, in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification.

Figure 1:
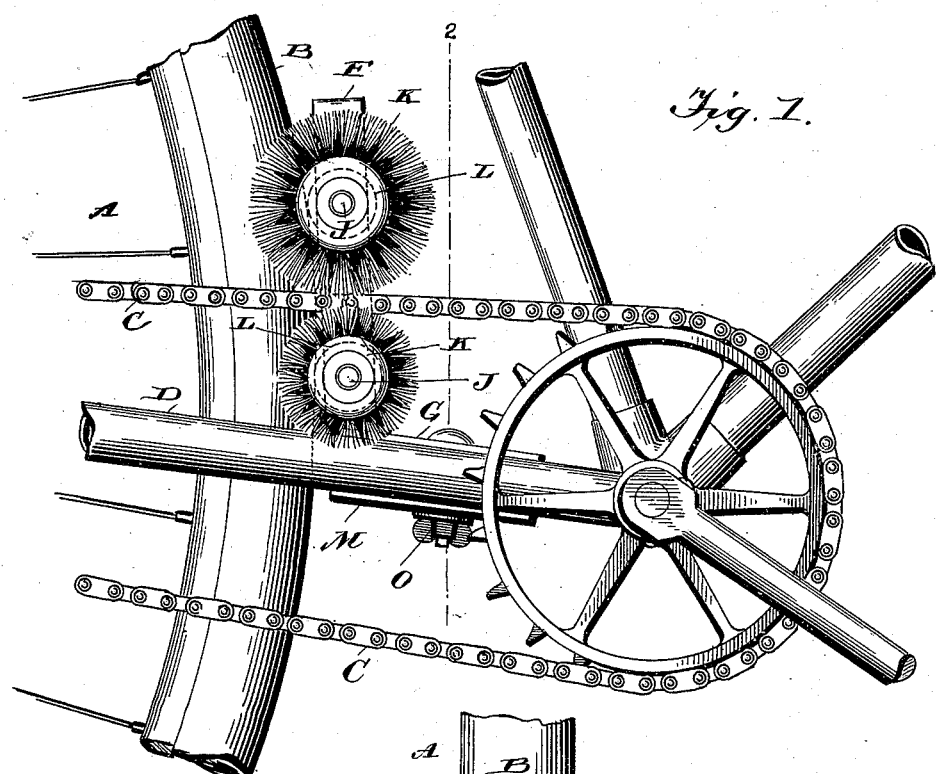
Figure 2:
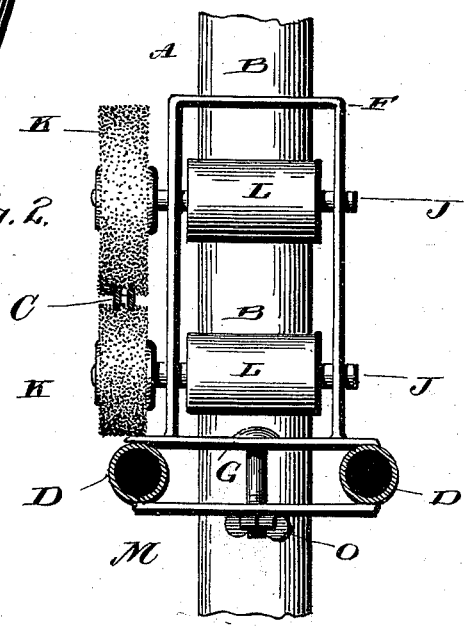

Figure 1 is a perspective view of the device as attached to the frame of a bicycle. Fig. 2 is an enlarged detail view of the cleaning device detached from the wheel.

Reference being had to the details of the drawings by letters A designates the rear wheel of a bicycle, having the rubber tire B.

C designates the sprocket-chain, and D D the forked member, having its free ends extending to the hub of said wheel.

F designates a rack, which is riveted or otherwise secured to the plate G, the said rack being adapted to carry the spindles J in perforations in its side walls. At corresponding ends of the said spindles are secured the rotary brushes K K, designed to be held in contact, one above and the other below the chain C. The raised portion L of the spindles may be of rubber or any other material, and said raised portion is designed to contact with the tire of the wheel as the latter is revolving.

M is a plate, which forms with the plate G a clamp, through which plates thumb-screws O O pass, one plate being placed above and the other beneath the forked members D D, and designed to hold the spindles and the brushes in such positions that the raised portions of the spindles will frictionally contact with the tire of the wheel A and the brushes with the upper and lower sides of the chain, as will be readily seen.

Having thus described my invention, what I claim to be new, and desire to secure by Letters Patent, is—

1. A sprocket chain cleaner for bicycles consisting of spindles designed to have contact with the tire of a bicycle wheel, combined with rotary brushes secured to said spindles and adapted to bear against the sprocket chain in their revolutions.

2. A rotary brush for cleaning sprocket wheel chains of bicycles, consisting of two spindles having raised friction bands, a rack, for holding said spindles, secured to the frame of the bicycle, rotary brushes secured at corresponding ends of said spindles, one below the other above the chain and adapted to bear against the said chain, combined with the tire of a wheel adapted to frictionally contact with the said raised portions of the spindles, substantially as shown and described.

3. In combination with the tire of a bicycle wheel, the rack F secured by clamps to the forks D, D, of a bicycle, the spindles J carried by said rack, the raised bands L, on said spindles adapted to frictionally contact with the said tire, the rotary brushes K, K, secured to corresponding ends of said spindles and designed to bear against an upper and lower side of the chain, whereby when the machine is in motion, the brushes will make more rapid revolutions than the sprocket chain, substantially as and for the purpose set forth.

In testimony whereof I affix my signature in presence of two witnesses.

CHARLES GEORGE POLLEYS.

Witnesses:
WM. G. WARD, Jr.,
ANNA C. WARD.